United States Patent
Matsushima et al.

(10) Patent No.: US 6,697,917 B1
(45) Date of Patent: Feb. 24, 2004

(54) PROCESSOR HAVING CACHE PURGE CONTROLLER

(75) Inventors: Junya Matsushima, Kawasaki (JP); Takumi Takeno, Kawasaki (JP); Kenichi Nabeya, Campbell, CA (US); Daisuke Ban, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/537,356

(22) Filed: Mar. 29, 2000

(30) Foreign Application Priority Data

Sep. 2, 1999 (JP) .................................. 11-248587

(51) Int. Cl.⁷ .......................... G06F 12/00; G06F 13/00
(52) U.S. Cl. .................. 711/125; 711/135; 711/137; 711/145; 710/14; 712/43; 712/207; 712/229
(58) Field of Search ............................. 711/125, 133, 711/145, 135, 137; 710/14; 712/43, 207, 229

(56) References Cited

U.S. PATENT DOCUMENTS

| | | | | |
|---|---|---|---|---|
| 5,530,804 A | * | 6/1996 | Edgington et al. ............ 714/30 |
| 5,860,111 A | * | 1/1999 | Martinez, Jr. et al. ....... 711/143 |
| 5,996,071 A | * | 11/1999 | White et al. ................. 712/238 |
| 6,240,508 B1 | * | 5/2001 | Brown et al. ................ 712/219 |

* cited by examiner

Primary Examiner—Reginald G. Bragdon
Assistant Examiner—Pierre M. Vital
(74) Attorney, Agent, or Firm—Staas & Halsey LLP

(57) ABSTRACT

The present invention prevents, at high speed, a malfunction from occurring at the time of changing a mode in a processor, in which information to be decoded varies with modes. The processor is provided with a circuit for referring to a result of decoding information or issuing an instruction when a write operation is performed on a register for storing data containing a bit that indicates a current mode, and for outputting a purge signal if the result of decoding information or issuing an instruction is information represented by a mode switching signal. Thus, when a mode switching signal is written to the register, a purge signal is outputted to a cache memory. Consequently, the valid bit of prefetched cache data is turned off. This prevents prefetched data from being decoded in a different mode. As a result, operations are normally performed after the switching of the mode. Alternatively, the purge signal is outputted by detecting a change in the value of the bit indicating the current mode.

3 Claims, 6 Drawing Sheets

PROCESSOR HAVING CACHE PURGE CONTROLLER

BACKGROUND OF THE INVENTION

1. Field of the Invention

The present invention generally relates to a processor that has a prefetch function and that performs processing in a plurality of modes, in which the information to be decoded varies, and has an instruction to dynamically switch the modes.

2. Description of the Related Art

Hitherto there have been proposed many techniques concerning a cache fetch in a processor. Further, a technique of providing a unit, which is adapted to perform processing in a plurality of modes, in a processor has been proposed as a technique concerning such a processor enabled to perform a cache fetch. In the case of the processor having such a unit, when a mode is switched to another mode, the same data string is decoded as a different instruction.

FIG. 1 illustrates a conventional software-implemented mode switching control method for controlling switching of a plurality of modes. That is, when a mode switching instruction is generated (at step S11), a trapping process is activated (at step S12). Then, if it is verified (at step S13) that the mode switching instruction is not illegal, the mode switching instruction is executed (at step S14). Thenceforth, instructions are executed in a new mode.

An operation of performing the aforementioned conventional method for switching the plurality of modes is controlled by software. There has been no hardware-implemented mode-switching control method. Thus, such an operation is performed at a low speed. Consequently, the conventional method has a drawback in that an instruction, which is prefetched before the switching of a mode, may be executed in an erroneous mode.

SUMMARY OF THE INVENTION

Accordingly, an object of the present invention is to provide a processor that has a prefetch function and that performs processing in a plurality of modes, with which information to be decoded varies, and that has an instruction to dynamically switch the modes and that includes means for preventing a malfunction, faster than in the case of being prevented under the control of software, being caused by executing, when a mode is switched, an instruction prefetched before the switching of the mode.

The present invention is accomplished to achieve the foregoing object.

According to an aspect of the present invention, there is provided a processor that has a prefetch function and that performs processing in a plurality of modes, with which information to be decoded varies, and that has an instruction to dynamically switch the modes. In this processor, when a write operation is performed on a register for storing data that contains a bit indicating a current mode, a result of decoding information in a decoding cycle is referred to, regardless of whether or not the value of the bit indicating the current mode is changed, and a cache purge signal is outputted when the result is information represented by a mode switching signal.

Thus, when a mode switching signal is written to the register, a cache purge signal is outputted to a cache memory. Consequently, the valid bit of the cache data is turned off. This prevents data prefetched in one mode from being decoded in a different mode. As a result, operations are normally performed upon completion of switching of the mode.

The processor according to the present invention can obtain similar advantageous effects by referring to a result of issuing an instruction in an issue cycle, instead of referring to the result of decoding information in a decoding cycle.

Further, the processor according to the present invention can provide similar advantageous effects by being adapted so that when a write operation is performed on the register, it is decided whether or not a change in the value of the bit indicating a current mode of the register occurs, and that when a change in the value of this bit is detected, a cache purge signal is outputted to the cache memory.

BRIEF DESCRIPTION OF THE DRAWINGS

The above features, objects and advantages of the present invention will become apparent from the following description of preferred embodiments with reference to the drawings in which like reference characters designate like or corresponding parts throughout several views, and in which.

DETAILED DESCRIPTION OF THE PREFERRED EMBODIMENTS

Hereinafter, the preferred embodiments of the present invention will be described in detail by referring to the accompanying drawings.

Figure 1:
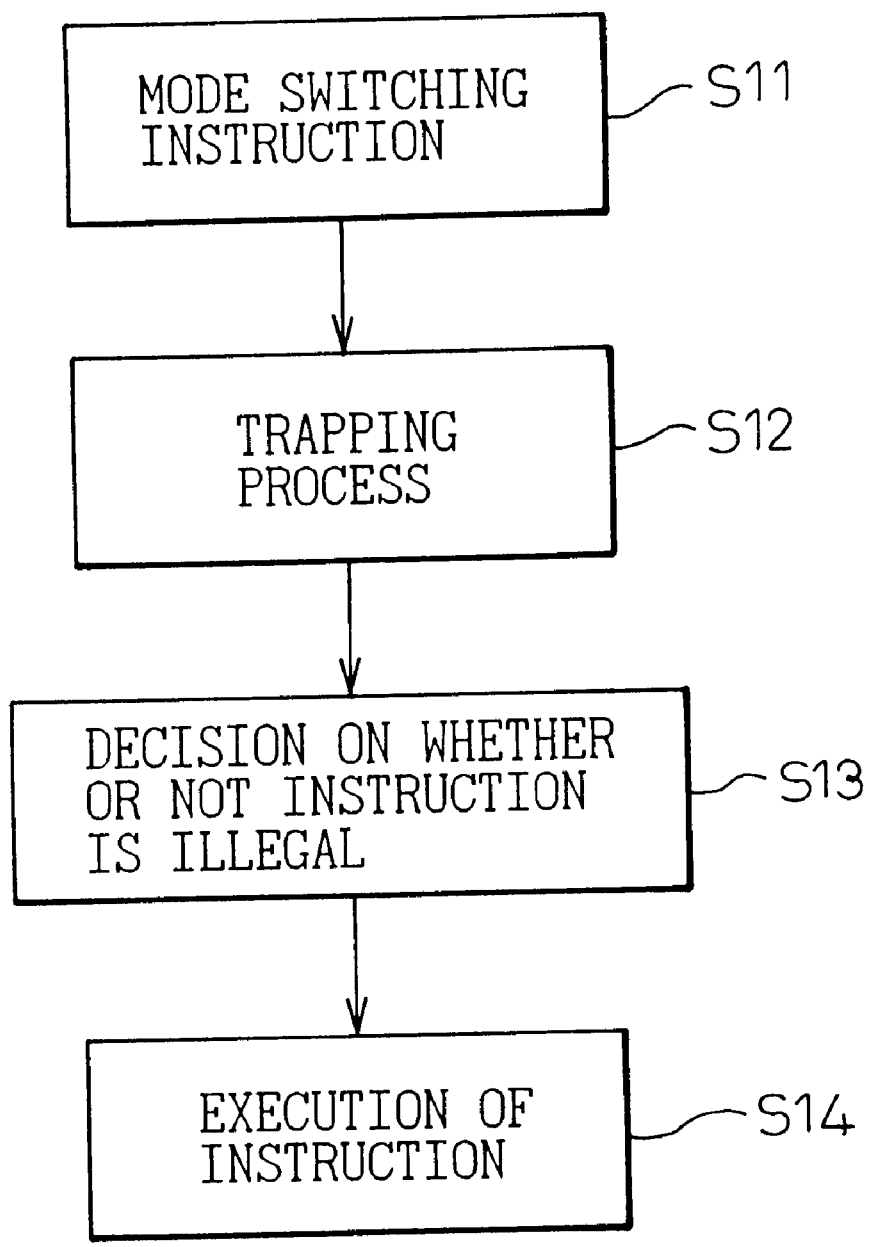
FIG. 1 is a conventional flowchart illustrating a cache fetch control method.
Figure 2:
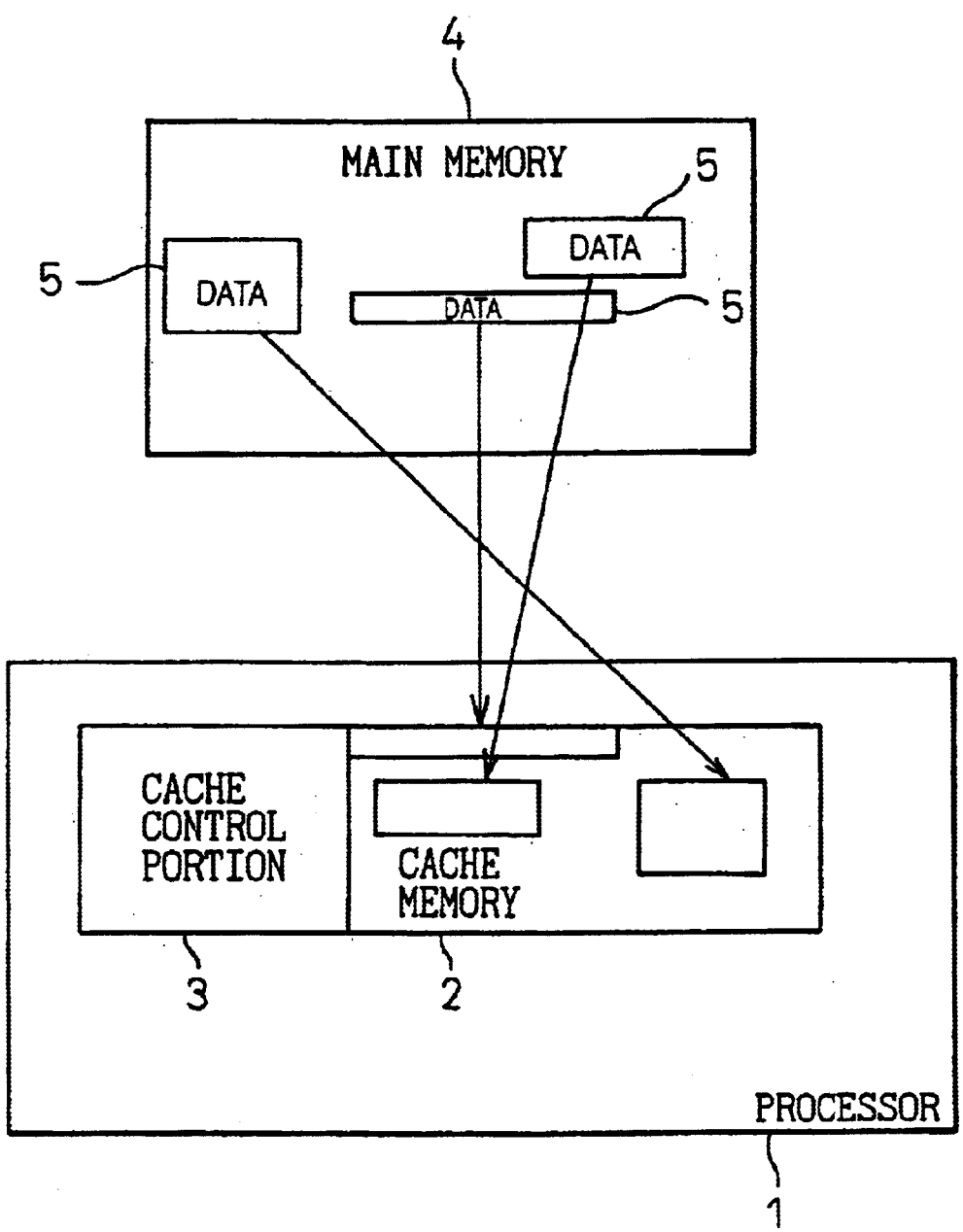
FIG. 2 is a diagram illustrating the entire constitution of a processor to which a cache purge controller of the present invention is applied.

FIG. 2 illustrates the entire constitution of a processor having a cache purge controller of the present invention. As shown in this figure, a processor 1 has a cache memory 2 and a cache control portion 3. When data 5 needed for processing is read from a main memory 4, the processor 1 causes the cache memory 2 to store the read data. Data stored in the main memory 4 includes a bit indicating a mode. The read data 5 is data which likely to be needed in future and which is prefetched concurrently with processing in progress. Thus, when a mode switching operation is performed, a valid bit of the prefetched data should be turned off so as to prevent the data from being decoded in a different mode. In the embodiments of the present invention, in the case that the processing in progress is a mode switching operation, or that the mode represented by a bit of the data is changed, the valid bit of the prefetched data 5 is turned off.

First Embodiment

Figure 3:
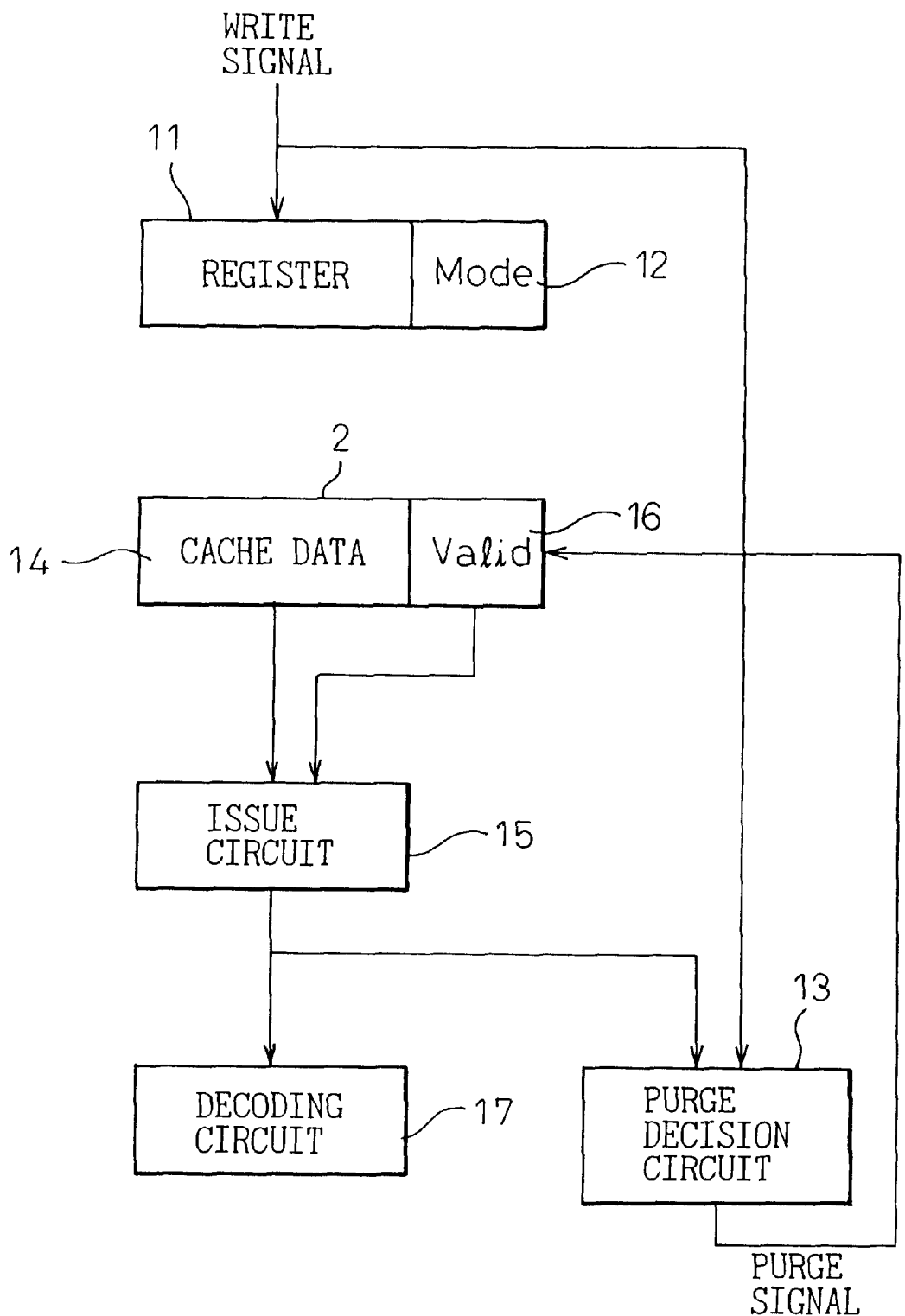
FIG. 3 is a diagram illustrating a circuit which is a first embodiment of the present invention.

FIG. 3 illustrates a cache purge control circuit which is a first embodiment of the present invention.

Figure 4:
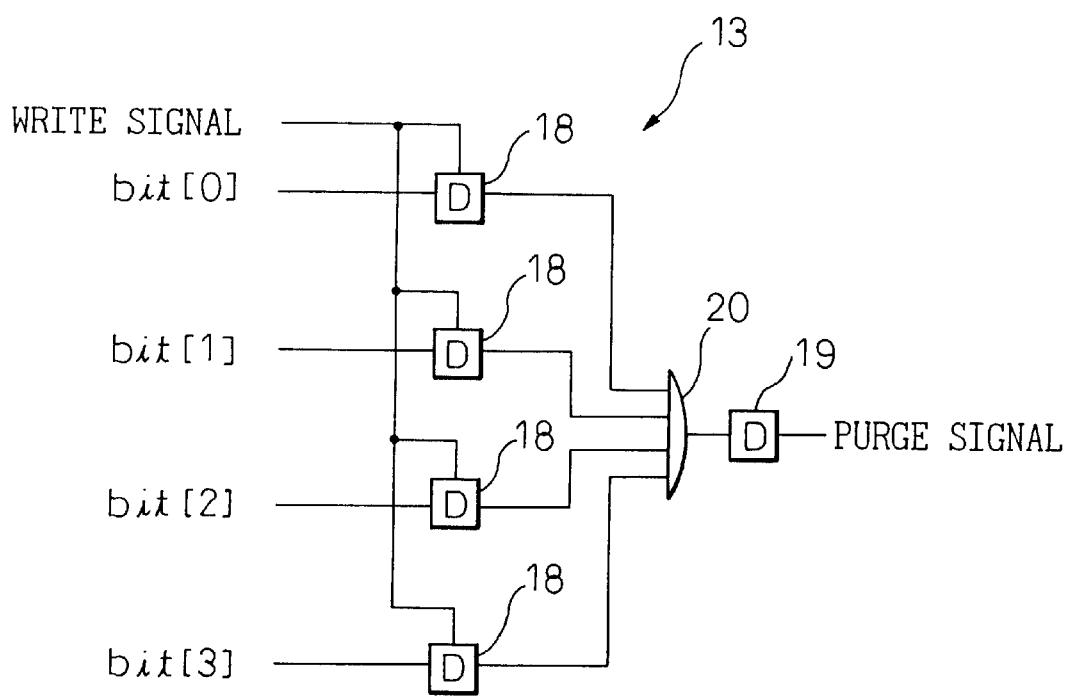
FIG. 4 is a diagram illustrating a purge decision circuit of FIG. 3.

A register 11, to which data needed for a currently running process is written, is prepared. The data written to this register 11 contains a bit 12 indicating a current mode. When the data stored in the register 11 is changed, a write signal is inputted to the register 11. This write signal is also inputted to a purge decision circuit 13. The purge decision circuit 13 performs a purge decision operation when the write signal is inputted to the register 11. The details of the purge decision operation will be described later. When the contents of the register 11 are rewritten, cache data 14 (which is the same as the data written to the register 11) for the currently running process is read by an issue circuit 15 from a cache memory 2 storing the data. The issue circuit 15 checks a valid bit 16 of the cache data 14. If the valid-bit is on, the issue circuit 15 passes the data 14 to the purge decision circuit 13 and a decoding circuit FIG. 4 illustrates a practical example of the purge decision circuit 13.

Output signals of the purge decision circuit 13, and a write signal are inputted to the purge decision circuit 13. In the case of the example illustrated in this figure, output data from the issue circuit 15 is constituted by 4 bits (namely, bit[0], bit[1], bit[2], and bit[3]). When all the four bits are "1", the output data corresponds to a mode switching instruction. At that time information represented by each of the four bits is held in a corresponding flip-flop (hereunder abbreviated as "FF") 18 with the timing according to the write signal. Then, an AND circuit 20 computes an AND of outputs of the four FFs 18. Subsequently, the value of the computed AND is stored in a FF 19. A signal representing this value stored in the FF 19 is used as a purge signal. When the value stored in the FF 19 is "1", a purge signal is outputted from the purge decision circuit 13 to the cache memory 12. Then, the valid bit of the cache data 16 is turned off.

Thus, when a mode switching instruction is decoded, the mode is switched. Simultaneously, the data prefetched by the cache memory 2 is purged therefrom. Consequently, no erroneous decoding occurs in subsequent operations performed after the mode is switched. Further, if there is no mode switching instruction, the cache memory 2 is not purged, and an ordinary operation is continued. Therefore, no erroneous decoding occurs in subsequent operations performed upon completion of switching the mode. Moreover, as illustrated in FIG. 4, the purge decision circuit 13 is implemented by hardware, so that the decision operation is performed at a high speed to thereby prevent an occurrence of a malfunction with reliability.

Second Embodiment

Figure 5:
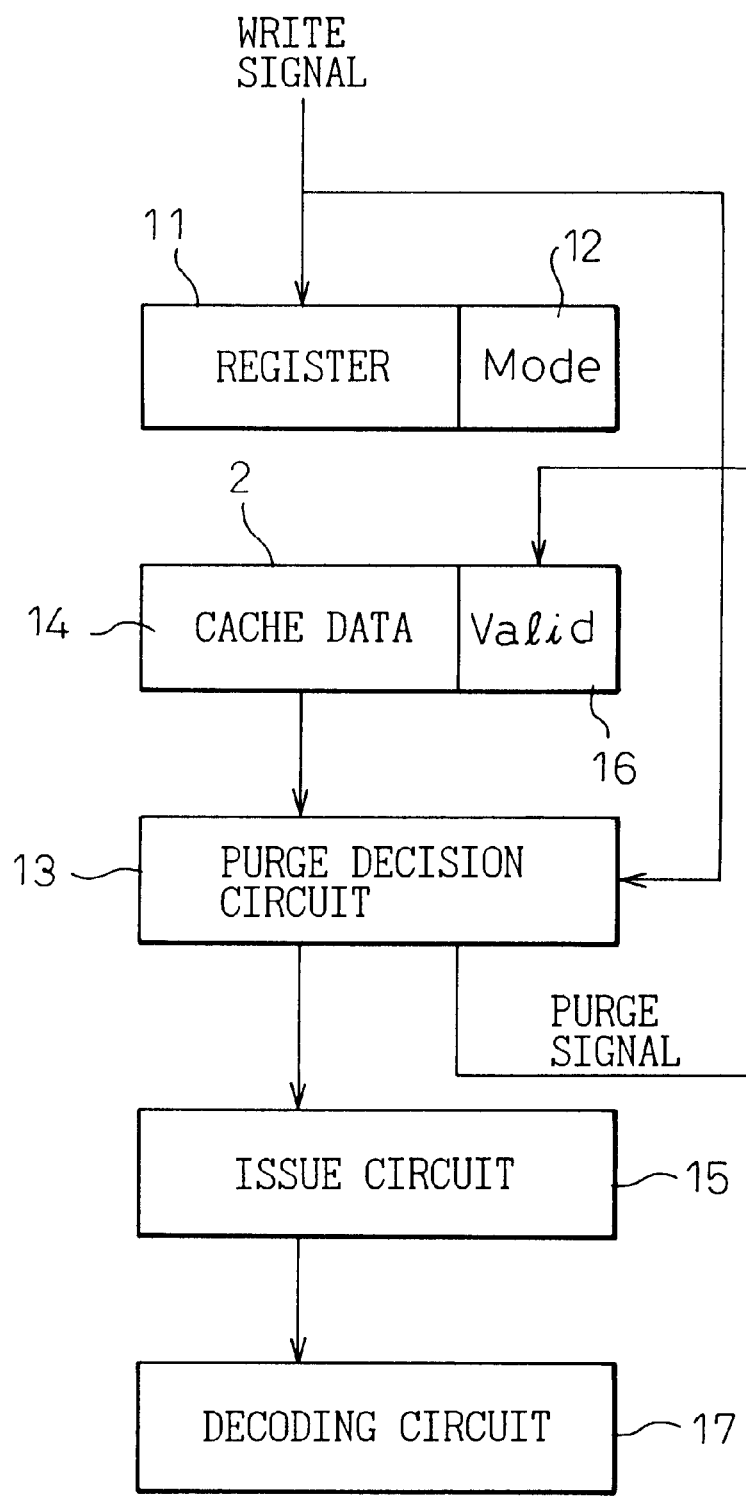
FIG. 5 is a diagram illustrating a circuit which is a second embodiment of the present invention.

FIG. 5 illustrates a cache purge control circuit which is a second embodiment of the present invention.

Although a cache purge operation is carried out in a decoding cycle by referring to a result of a decoding operation performed in a decoding cycle in the aforementioned first embodiment, a cache purge operation is performed in an issue cycle by referring to the result of issuing an instruction in the second embodiment. As shown in FIG. 5., the purge decision circuit 13 is provided between the cache memory 2 and the issue circuit 15. The second embodiment employs the circuit illustrated in FIG. 4 as the purge decision circuit 13. The remaining parts of this embodiment are the same as the corresponding parts of the first embodiment described with reference to FIGS. 3 and 4. Thus, the description of such parts is omitted herein.

Third Embodiment

In the aforementioned first and second embodiments of the present invention, the value of the valid bit of cache data is set by referring to a mode switching signal, regardless of whether or not the value of the bit representing the mode changes, when a write operation is performed on the register 11. In contrast, in the third embodiment, the value of the valid bit is set by deciding whether or not the value of the bit representing has mode changed. Hereinafter, the third embodiment will be described in detail.

Figure 6:
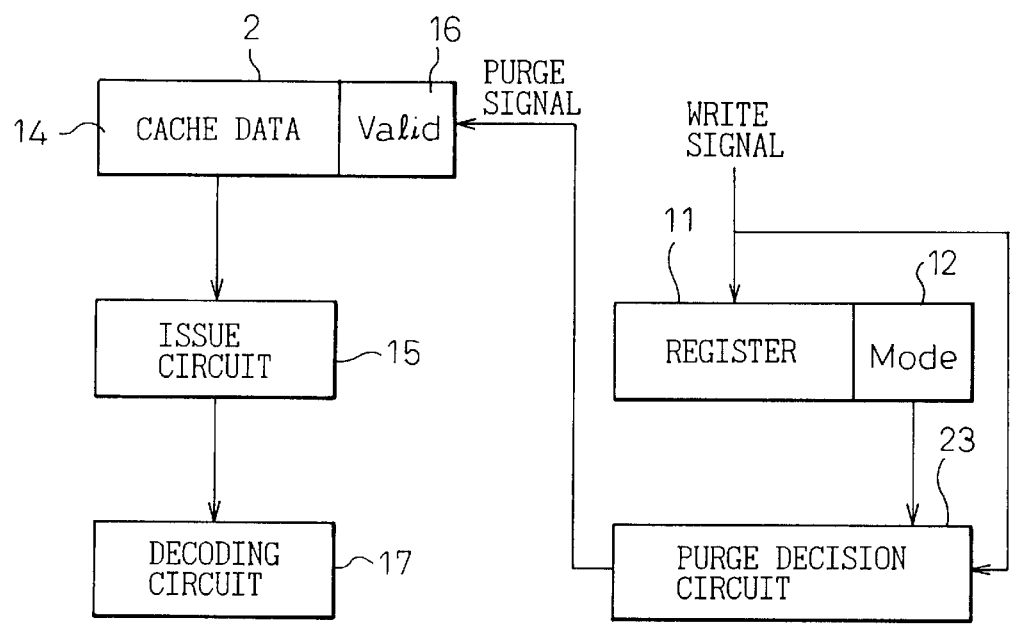
FIG. 6 is a diagram illustrating a circuit which is a third embodiment of the present invention.

FIG. 6 illustrates a cache purge control circuit which is the third embodiment of the present invention.

In this embodiment, a write signal is inputted to the purge decision circuit 23. Thus, a value of the bit 12 representing the mode of the register 11 is inputted thereto. The remaining parts of this embodiment are the same as the corresponding parts of the second embodiment, which has been described by referring to FIG. 5. Therefore, the description of such parts is omitted herein.

Figure 7:
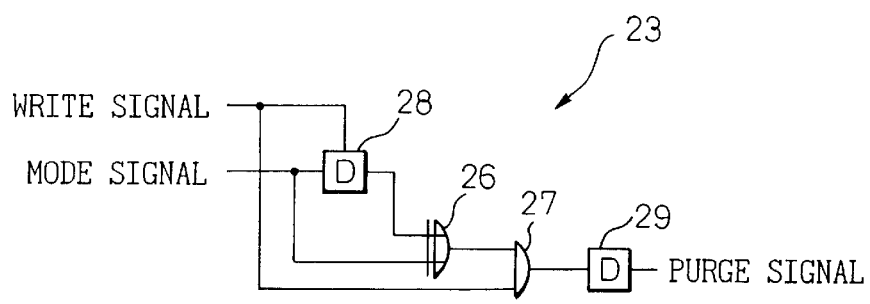
FIG. 7 is a diagram illustrating a purge decision circuit of FIG. 6.

FIG. 7 illustrates a practical example of a purge decision circuit 23 of the circuit 6 of FIG. 6. It is assumed herein that the value of the valid bit of cache data is determined according to whether the state of the mode signal changes. A mode signal and a write signal are inputted to the purge decision circuit 23 from the register 11. A signal representing the value of the bit, which indicates a current mode, is used as the mode signal. The value represented by the previous state of the mode signal is held in a FF 28 with the timing determined according to the write signal. Furthermore, an exclusive-OR circuit 26 computes an exclusive-OR of the value represented by the mode signal held in the FF 28 and a value represented by a preceding mode signal previously held by the FF 28. The value computed by the circuit 26 is held in a FF 29 with the timing determined according to the write signal. A signal representing the value held in the FF 29 is used as a purge signal. When the value represented by the purge signal is "1", the valid bit of the cache data is turned off, so that the cache data is purged.

According to the present invention, there is provided the aforementioned controller in a processor that has a prefetch function and that performs processing in a plurality of modes, with which information to be decoded varies, and that has an instruction to dynamically switch the modes. Thus, at high speed, an erroneously prefetched instruction is purged and the plurality of modes can be switched.

Although the preferred embodiments of the present invention have been described above, it should be understood that the present invention is not limited thereto and that other modifications will be apparent to those skilled in the art without departing from the sprint of the invention.

The scope of the present invention, therefore, should be determined solely by the appended claims.

What is claimed is:

1. A processor having a prefetch function and performing processing in a plurality of modes, with which information to be decoded varies, and having an instruction to dynamically switch the plurality of modes, the processor comprising:

a register storing data that contains a bit indicating a current mode;

a cache memory storing cache data that represents a prefetched instruction;

a purge decision circuit referring to a result of decoding in a decoding cycle, and outputting a cache purge signal to the cache memory when the result of decoding is information represented by a mode switching signal and when a signal input to the register is a write signal, thereby causing the cache memory to perform a cache purge operation of purging the prefetched instruction therefrom; and an issue circuit reading the cache data from the cache memory, checking the read cache data, and issuing output data according to a result of checking, wherein the purge decision circuit comprises a circuit outputting the cache purge signal with timing determined according to the write signal when the output data of the issue circuit includes data represented by the mode switching signal.

2. A processor having a prefetch function and performing processing in a plurality of modes, with which information to be decoded varies, and having an instruction to dynamically switch the plurality of modes, the processor comprising:

a register storing data that contains a bit indicating a current mode;

a cache memory storing cache data that represents a prefetched instruction;

a purge decision circuit referring to a result of issuing an instruction in an issue cycle, and outputting a cache purge signal to the cache memory when the result is information represented by a mode switching signal and when a signal input to the register is a write signal, thereby causing the cache memory to perform a cache purge operation of purging the prefetched instruction therefrom; and an issue circuit receiving from the purge decision circuit data representing the prefetched instruction, wherein the purge decision circuit is provided between the cache memory and the issue circuit, and comprises a circuit outputting the cache purge signal with timing determined according to the write signal when the data fetched by the purge decision circuit includes data represented by the mode switching signal.

3. A processor having a prefetch function and performing processing in a plurality of modes, with which information to be decoded varies, and having an instruction to dynamically switch the plurality of modes, the processor comprising:

a register storing data that contains a bit indicating a current mode;

a cache memory storing cache data that represents a prefetched instruction; and a purge decision circuit deciding whether or not a change in a value of the bit indicating the current mode is detected, and outputting a cache purge signal to the cache memory when a change in the value of the bit indicating the current mode is detected and when a signal input to the register is a write signal, thereby causing the cache memory to perform a cache purge operation of purging the prefetched instruction therefrom, wherein the purge decision circuit comprises
a circuit deciding the presence or absence of a change in the value of the bit indicating the current mode by comparing a value of the bit indicating a current mode at a moment, at which the write signal is input thereto, with a value of the bit indicating a preceding mode, and a circuit outputting, when a change in the value of the bit is detected, the cache purge signal with the timing determined according to the write signal.

* * * * *